United States Patent
Park et al.

(10) Patent No.: US 8,787,442 B2
(45) Date of Patent: Jul. 22, 2014

(54) COMMUNICATION SYSTEM AND DATA TRANSCEPTION METHOD THEREOF

(75) Inventors: Jae-Hyeon Park, Seoul (KR); Gi-Bong Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1352 days.

(21) Appl. No.: 12/071,963

(22) Filed: Feb. 28, 2008

(65) Prior Publication Data

US 2008/0205530 A1 Aug. 28, 2008

(30) Foreign Application Priority Data

Feb. 28, 2007 (KR) .................. 10-2007-0020420

(51) Int. Cl.
*H04B 1/66* (2006.01)
(52) U.S. Cl.
USPC .......... 375/240; 375/219; 375/220; 455/41.1; 455/41.2; 455/41.3
(58) Field of Classification Search
USPC ............... 375/240, 219, 220; 455/41, 1, 41.2, 455/41.3
See application file for complete search history.

(56) References Cited

U.S. PATENT DOCUMENTS

| | | | | |
|---|---|---|---|---|
| 5,170,266 A | * | 12/1992 | Marsh et al. .................. | 358/468 |
| 5,568,650 A | * | 10/1996 | Mori ............................... | 710/52 |
| 5,666,161 A | * | 9/1997 | Kohiyama et al. ........ | 375/240.18 |
| 6,593,925 B1 | * | 7/2003 | Hakura et al. ................ | 345/426 |
| 6,895,463 B2 | * | 5/2005 | Oga et al. ....................... | 711/103 |
| 2003/0031247 A1 | | 2/2003 | Takahashi et al. | |

FOREIGN PATENT DOCUMENTS

| | | |
|---|---|---|
| JP | 2004-258825 | 9/2004 |
| KR | 10-2002-0008579 | 1/2002 |
| KR | 102003003207 | 4/2003 |
| KR | 10-2005-0035457 | 4/2005 |
| KR | 10-2007-0008069 | 1/2007 |
| KR | 10-2007-00545520 | 5/2007 |

* cited by examiner

*Primary Examiner* — Phuong Phu
(74) *Attorney, Agent, or Firm* — Harness, Dickey & Pierce

(57) ABSTRACT

An apparatus and method for receiving data in a communication system including a communication module and a memory. The communication module may compress data received from an external system by using a first data compression/decompression block, and may transfer the compressed data to the data bus. The memory may decompress the compressed data received from the data bus using the second data compression/decompression block, and may store the decompressed data in the memory. Also, the memory may compress data to be transmitted using the second data compression/decompression block and may transfer the compressed data to the data bus. The communication module may decompress the compressed data received from the data bus using the first data compression/decompression block, and may transmit the decompressed data to the external system.

13 Claims, 4 Drawing Sheets

COMMUNICATION SYSTEM AND DATA TRANSCEPTION METHOD THEREOF

PRIORITY STATEMENT

This U.S. non-provisional patent application claims the benefit of Korean Patent Application No. 10-2007-20420, filed on Feb. 28, 2007, the disclosure of which is incorporated herein in its entirety by reference.

BACKGROUND

1. Field

Example embodiments relate to communication systems, for example a method and apparatus for receiving and transmitting data including a communication module and a memory.

2. Description of the Related Art

Communication systems are increasingly interested in ultrahigh-speed radio communication technologies capable of exchanging a large amount of data between electronic devices. Ultra-wide band (UWB) technology may be considered an ultrahigh-speed radio technology. UWB technology may be regarded as an innovative radio communication mode advantageous to digital home-network infrastructures because of the convenience offered to users operating digital apparatuses and household appliances.

A UWB system may enable ultrahigh-speed data transmission of several hundreds Mbps in a close distance of around 10 meters with a wide frequency band over approximately 500 MHz. Also, UWB technology may have the capability of providing a low output without interference from traditional radio-wave subscribers. Due to these characteristics, the UWB system may be able to wirelessly transmit large-scale data of several hundreds Mbps in a relatively short period of time between electronic devices, such as personal computers and peripheral apparatuses (e.g., printers), between household appliances, or between any similar office and home electronic devices.

Similar to UWB technology, Bluetooth is a commercial local-area communication technology, which may be used by mobile phones or headsets. The Bluetooth system may enable electronic apparatuses to locally communicate with each other, without wire connections, within approximately 10 meters at the data rate of 1 Mbps, for example. In contrast to Bluetooth technology, a UWB system may utilize a higher data transmission rate. For instance, the UWB system may be faster than the current Bluetooth system by approximately 100~200 times in data transmission rate. For example, the difference of data rates between UWB technology and the current Bluetooth system, may allow transmitting a movie file, which has a running time of 2 hours, from a mobile phone to another mobile phone within approximately 10 meters in around 10 seconds. Furthermore, UWB technologies make it possible to transmit motion pictures taken by a camcorder or digital video camera to a television or personal computer, or transfer large amounts of information between mobile phones. By installing a UWB chip at a USB port of a personal computer, it may be possible to exchange data without connecting a mobile storage to the personal computer via a wire or other physical connections.

The UWB system may be expected to be a core technology for digital home networks because of its low power, ultrabroad band, and ultrahigh fast transmission rate. Furthermore, because UWB technology may be wireless, electric cables and wires may be no longer needed for transmitting large amounts of data between electrical devices. For instance, the UWB system may allow a printer to accept a large amount of data from a personal computer or a home-network system (e.g., home gateway) with a high data rate without the need for electric cables, wires, or other physical connections.

Currently, efforts for developing and improving UWB technologies appear to be accelerating in the United States. The U.S. Federal Communications Commission (FCC) has allowed UWB technology to be commercially available under certain conditions. The FCC defines the UWB system as a communication mode occupying a frequency bandwidth over 500 MHz or 20% of a center frequency. The bandwidth of a UWB system may be −10 dB, which may be different from other communication modes that may be −3 dB. Moreover, a UWB system with a single band may be able to transmit data by relatively short baseband pulses of several nanoseconds without carrier waves. As compared to traditional narrowband communication modes, data may be transmitted by loading baseband signals onto carrier waves. UWB pulses oscillating with several nanoseconds in time may operate in a broadband over several GHz of frequency spectrum, for example. Therefore, as compared to traditional narrowband radio communication techniques, a UWB system may have a remarkable wideband frequency, and the capabilities of transmitting large-scale, high frequency data.

FIG. 1 is a block diagram illustrating a conventional UWB system 100. Referring to FIG. 1, the UWB system 100 may include a plurality of masters 110 and 120, a slave 130, and a data bus 101. The plurality of masters may include a central processing unit (CPU) 110, and a UWB Module 120. The slave may include a system memory 130. In the UWB system 100, the CPU 110 and the UWB Module 120 may be accessing the slave (system memory) 130 at the same time. For that reason, the UWB system 100 may include a bus arbiter (not shown) for allocating one of the CPU 110 and the UWB Module 120 priority to use the data bus 101. As a result, a bottleneck of data waiting to be transferred occurs within the UWB system 100, which may make the data transmission rate irregular.

SUMMARY

Example embodiments of the present application may reduce the possibility of a bottleneck occurring on a data bus within a communication system.

Example embodiments provide a method and apparatus for receiving and transmitting data including a communication module and a memory. The method includes compressing received data in the communication module, transferring the compressed data to the memory, decompressing the compressed data, and storing the decompressed data into the memory. The communication module may include a data compression block for compressing the received data, and the memory may include a data decompression block for decompressing the compressed data. The data compression block may include a bypass function to transfer the data without compression. The data decompression block may include a bypass function to transfer the uncompressed data without decompression.

According to at least one example embodiment, a method for receiving and transmitting data including a communication module and a memory, may include reading data to be transferred from the memory, compressing the read data, transferring the compressed data to the communication module, decompressing the compressed data, and transmitting the decompressed data to an external system. The memory may include a data compression block for compressing the read data and the communication module may include a data decompression block for decompressing the compressed data.

According to at least one example embodiment, a communication system may include at least one master, a slave controlled by the at least one master, and a data bus shared by the at least one master and the slave, wherein data transferred to the data bus is compressed data. The master may be a communication module transceiving data with an external system, and the slave may be a memory. The communication module may include a first data compression/decompression block, and the memory may include a second data compression/decompression block. The communication module may compress data received from the external system by using the first data compression/decompression block, and may transfer the compressed data to the data bus. The memory may decompress the compressed data received from the data bus using the second data compression/decompression block, and may store the decompressed data. Furthermore, the memory may compress data to be transmitted using the second data compression/decompression block, and may transfer the compressed data to the data bus. The communication module may decompress the compressed data received from the data bus using the first data compression/decompression block, and may transmit the decompressed data to the external system. The communication module may be operable in ultra-wide band.

According to at least one example embodiment, the slave may be a portable memory device. The at least one master may include a first and second master, where only the compressed data may be transferred to the data bus. The first master may be a central processing unit, the second master may be a communication module transceiving data with an external system, and the slave may be a memory. The central processing unit may further include a data compression/decompression block. The central processing unit may compress data received by the communication module from the external system, using software.

BRIEF DESCRIPTION OF THE DRAWINGS

The above and other features and advantages will become more apparent by describing in detail example embodiments thereof with reference to the attached drawings in which.

DETAILED DESCRIPTION OF EXAMPLE EMBODIMENTS

Figure 1:
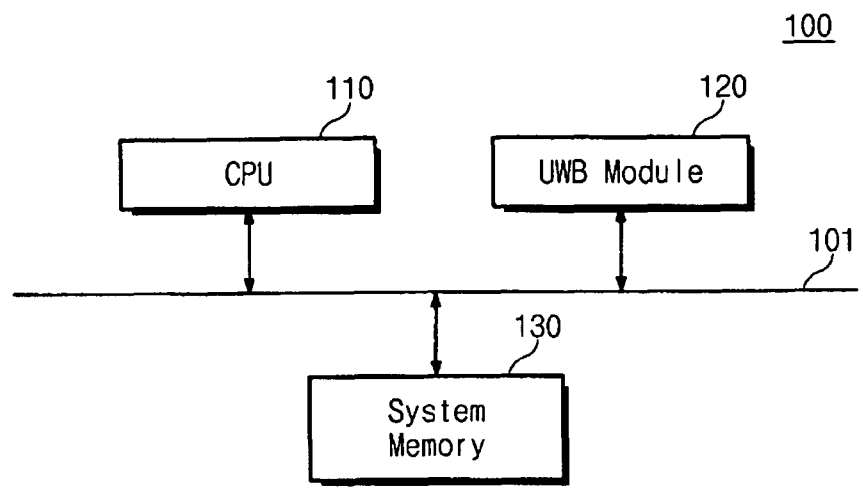
FIG. 1 is a block diagram illustrating a conventional UWB system.

Detailed example embodiments are disclosed herein. However, specific structural and functional details disclosed herein are merely representative for purposes of describing example embodiments. Accordingly, example embodiments are capable of various modifications and alternative forms. It should be understood, however, that there is no intent to limit example embodiments to the particular forms disclosed, but on the contrary, example embodiments are to cover all modifications, equivalents, and alternatives falling within the scope of the application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used here, the term "and/or" includes any and all combinations of one or more of the associated listed items.

The terminology used herein is for the purpose of describing particular embodiments only and is not intended to be limiting. As used here, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Example embodiments will now be described more fully with reference to the accompanying drawings. This invention, however, may be embodied in many different forms and should not be construed as limited to example embodiments set forth herein. Rather, example embodiments are provided so that this disclosure will be thorough and complete, and will fully convey the scope of the application to those skilled in the art. In the drawings, like numbers refer to like elements throughout.

Figure 2:
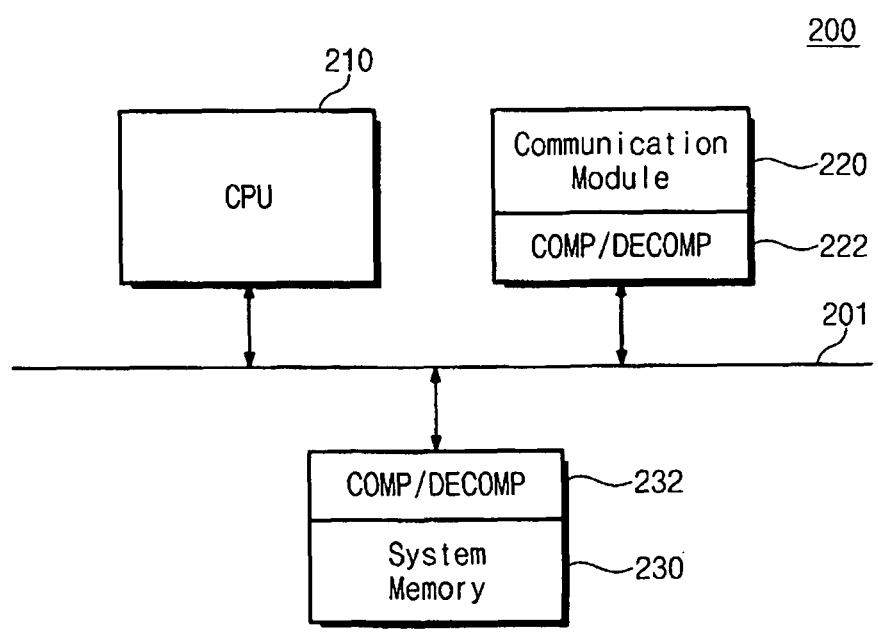
FIG. 2 is a block diagram illustrating a communication system according to an example embodiment of the present application.

FIG. 2 is a block diagram illustrating a communication system according to an example embodiment of the present application. Referring to FIG. 2, the communication system 200 includes a plurality of masters 210 and 220, a slave 230, and a data bus 201. The plurality of masters may include a central processing unit (CPU) 210 for controlling an overall operation of the communication system 200, and a communication module 220 for conducting data communication with an external system (not shown). The slave may include a system memory 230. The system memory 230 may be a random access memory (RAM) or a read-only memory (ROM). The CPU 210 and the communication module 220 may be able to directly access the system memory 230. The communication module 220 and the system memory 230 may include a data compression/decompression blocks 222 and 232, respectively.

According to an example embodiment of the present application, the communication module 220 may receive data from an external system. The communication module 220 may compress the received data by using the data compression/decompression block 222. The communication module 220 may transfer the compressed data to the system memory 230 through the data bus 201. Compressed data on the data bus 201 being transferred to the system memory 230 may be decompressed by the data compression/decompression block 232 of the system memory 230. The system memory 230 may store the decompressed data.

According to an example embodiment of the present application, the communication system 200 may read data to be transferred from the system memory 230. For instance, when outputting data to the data bus 201 from the system memory 230, the data compression/decompression block 232 of the system memory 230 may compress data, and load the compressed data on the data bus 201. The compressed data transferred through the data bus 201 may be decompressed by the data compression/decompression block 222 of the communication module 220. The communication module 220 may accept the decompressed data.

The CPU 210 may include an Advanced RISC Machine (ARM), for example. The ARM may be a 32-bit Reduced Instruction Set Computer (RISC) processor used within embedded integrated circuits. Because the ARM may be designed to consume low power, the ARM may be widely employed in mobile apparatuses.

The communication module 220 may be a local-area radio communication module. Examples of local-area radio communication modules include ZigBee, Bluetooth, and UWB. The ZigBee system is a radio communication technology, which operates in low power, and may be utilized in short distance, vertical applications such as sensor networks within factory automation, building management, automobiles, and home networks, for example. The BlueTooth system is capable of transmitting and receiving voice and data between electronic apparatuses in radio mode, which may operate in low power, and may be used within mobile phones.

The system memory 230 may store information regarding operation of the communication system 200. For example, the system memory 230 may store information regarding drive programs for controlling the communication system 200, as well as data relevant to the drive programs. Also, the system memory 230 may store information that may be provided from the communication module 220, and may transfer the communication module information when there is a request for service from the communication module 220.

According to example embodiments of the present application, the data compression/decompression blocks, 222 and 232, may be implemented in various configurations. For instance, the data compression/decompression blocks 222 and 232 may be implemented by firmware such as ARMs or by hardware with compression/decompression engines. When the data compression/decompression blocks are implemented by general compression logic circuits, a volume of data may be reduced approximately 50% of the original volume.

The data compression/decompression blocks 222 and 232 may function to compress and decompress data. Furthermore, the data compression/decompression blocks 222 and 232 may also include a bypass function that may allow the exchange of uncompressed data between the communication module 220 and the system memory 230. For instance, if the data to be processed by the communication system 200 is smaller than large-scale data (e.g., an image file or voice file), then the compression and decompression function of the data compression/decompression blocks 222 and 232 may be bypassed. In other words, there may be no need to conduct data compression.

When compressed data is transferred between the communication module 220 and the system memory 230, the probability of a bottleneck occurring on the data bus 201 may be reduced. Although the communication system 200 shown in FIG. 2 only compresses data transferred between the communication module 220 and the system memory 230, all data (not just data transferred from the communication module 220 and the system memory 230) may be transferred from the data bus 201 within example embodiments of the present application.

Figure 3:
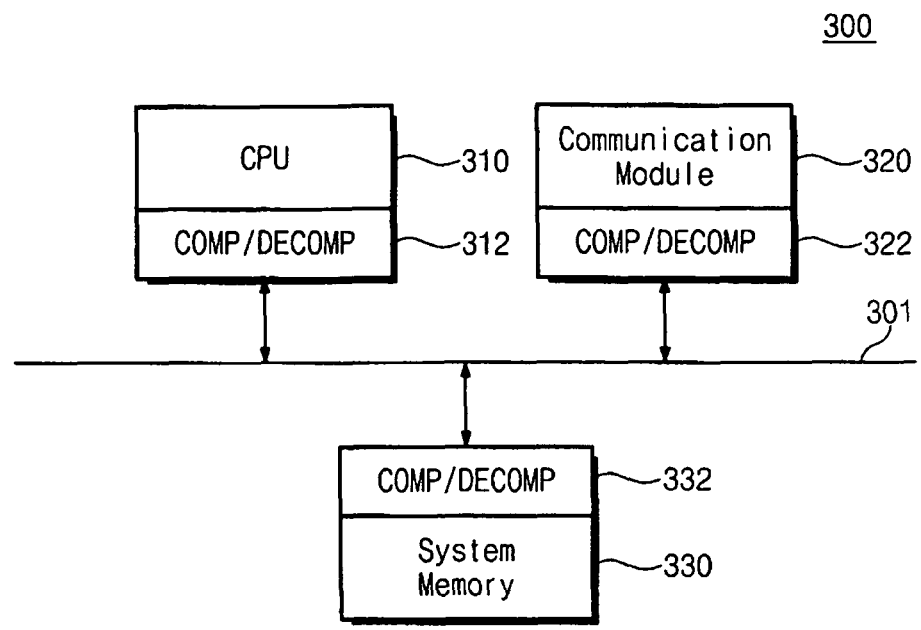
FIG. 3 is a block diagram illustrating a communication system according to another example embodiment of the present application.

FIG. 3 a block diagram illustrating a communication system according to another example embodiment of the present application. The communication system 300 may include a plurality of masters, 310 and 320, and a slave 330. The plurality of masters may be a CPU 310 and a communication module 320. The slave may be a system memory 330. The CPU 310 may include a data compression/decompression block 312. A communication module 320, a data compression/decompression block 322, a system memory 330, a data compression/decompression block 332, and a data bus 301 may be the same as mentioned in FIG. 2. Therefore, the details and operation of each component are omitted for the sake of brevity. Furthermore, the communication system 300 may include an additional data bus arbiter (not shown) for allocating priorities of the data bus 301 to the plurality of masters, 310 and 320. According to an example embodiment, only compressed data may be transferred to the data bus 301. As a result, the probability of a bottleneck occurring on the data bus 301 may be reduced.

Figure 4:
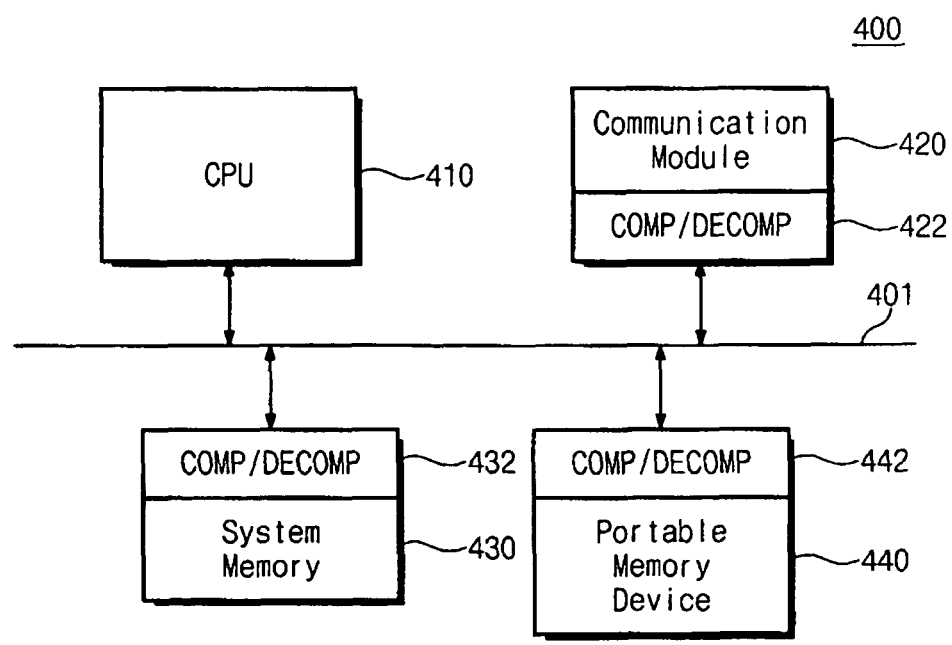
FIG. 4 is a block diagram illustrating a communication system according to another example embodiment of the present application.

FIG. 4 a block diagram illustrating a communication system according to another example embodiment of the present application. Referring to FIG. 4, the communication system 400 may further include a portable memory device 440. A CPU 410, a communication module 420, a data compression/decompression block 422, a system memory 430, a data compression/decompression block 432, and a data bus 401 may be the same as mentioned in FIG. 2. Therefore, the details and operation of each component are omitted for the sake of brevity.

The portable memory device 440 may include a data compression/decompression block 442. The portable memory device 440 may be designed as a slave storage for containing data. The portable memory device 440 may be a Compact Flash (CF), a Secure Digital Input/Output (SDIO), or a USB memory, for example.

The communication module 420 may store data in the portable memory device 440. For instance, after the data compression/decompression block 442 compresses data, the communication module 420 may transfer compressed data to the data bus 401. The portable memory device 440 may receive the compressed data from the data bus 401, decompress the data received from the data bus 401 by using the data compression/decompression block 442, and may store the decompressed data.

Data may be read from the portable memory device 440 by the communication module 440. For instance, the portable memory device 440 may compress data by the data compression/decompression block 442 and may transfer the compressed data to the data bus 401. The communication module block 420 may receive the compressed data from the data bus 401 and may accept data after decompressing the compressed data by using the data compression/decompression block 422.

Figure 5:
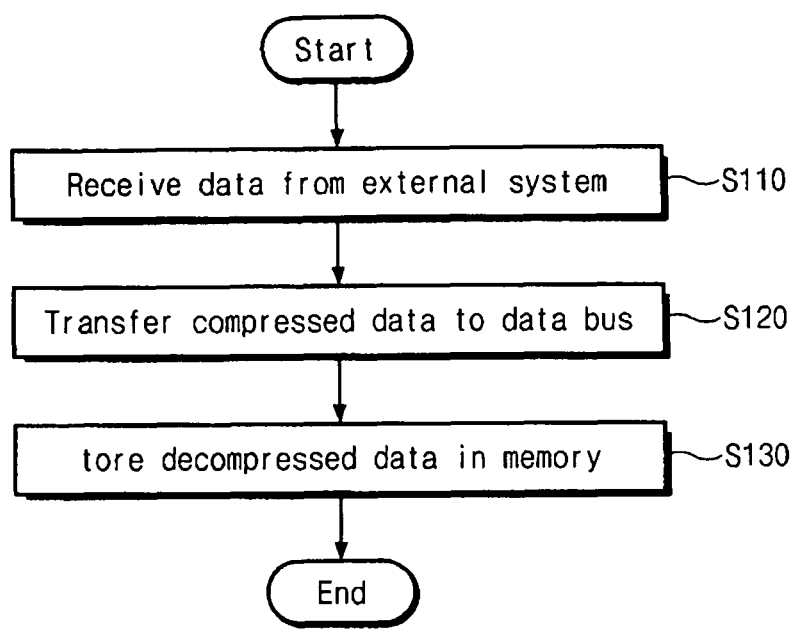
FIG. 5 is a flow chart illustrating a method for data reception within a communication system according to an example embodiment of the present application.

FIG. 5 is a flow chart illustrating a method of data reception within a communication system according to an example embodiment of the present application. This method of data reception is shown with reference to FIGS. 2 and 5.

In step S110, the communication module 220 of the communication system 200 may receive data from an external system. The data received from the external system may be transmitted wirelessly, or through hard-wired means. A modem (not shown) of the communication module 220 may be supplied with the external data.

In step S120, the communication module 220 may compress the data transmitted from the external system by the data compression/decompression block 222 of the communication module 220. The compressed data may be transferred to the data bus 201. The communication module 220 may further include a register (not shown) for setting a location for storing the compressed data in the system memory 230. The communication module 220 may store the compressed data in the system memory 230 by a value set in the register.

In step S130, the system memory 230 may receive the compressed data from the data bus 201. The data compression/decompression block 232 of the system memory 230 may decompress the compressed data transferred from the data bus 201. The decompressed data may be stored in the system memory 230. Furthermore, referring to FIG. 4, the portable memory device 440 may store received data in the same manner.

Figure 6:
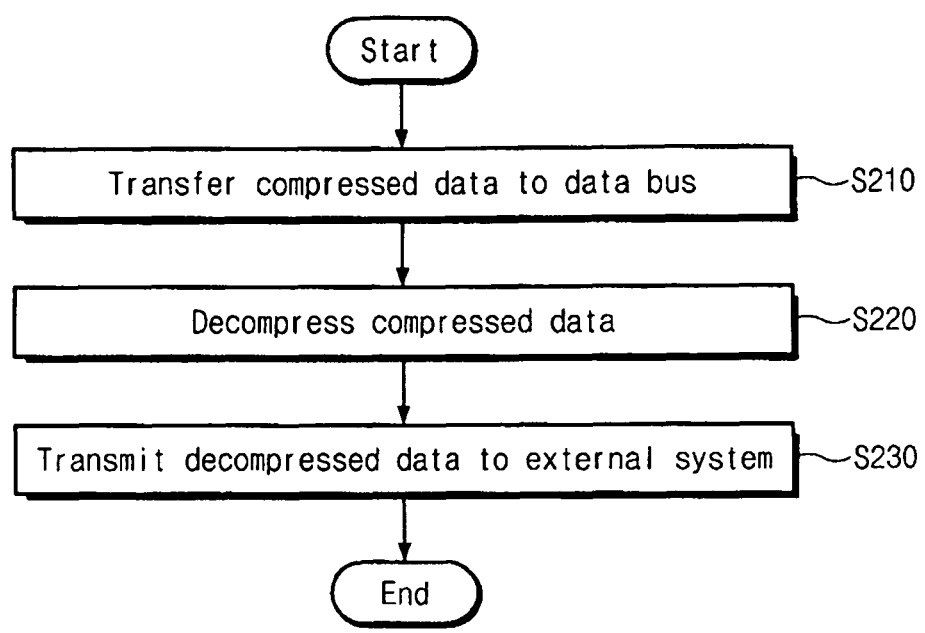
FIG. 6 is a flow chart illustrating a method for data transmission with a communication system according to an example embodiment of the present application.

FIG. 6 is a flow chart illustrating a method of data transmission with a communication system according to an example embodiment of the present application. This method of data transmission is shown with reference to FIGS. 2 and 6.

In step S210, the system memory 230 may compress data transmitted to the data bus 201 by using the data compression/decompression block 232, and may transfer the compressed data to the data bus 201.

In step S220, the communication module 220 may receive the compressed data from the data bus 201. The data compression/decompression block 222 of the communication module 220 may decompress the compressed data transferred from the data bus 201.

In step S230, the communication module 220 may transmit the decompressed data to the external system. Furthermore, referring to FIG. 4, data that may be read from the portable memory device 440 may be transmitted in the same matter. As a result, the probability of a bottleneck occurring on the data bus may be reduced.

While example embodiments have been shown and described with reference to FIGS. 2-6, it will be understood by those skilled in the art that various changes in form and details may be made therein without departing from the spirit and scope of this disclosure.

What is claimed is:

1. A communication system comprising:
    at least one master configured to received data;
    at least one slave controlled by the at least one master; and
    a data bus shared by the at least one master and the at least one slave, the data bus being configured to transfer the data,
    wherein the at least one master includes a first data compression block configured to compress the data, and the at least one slave includes a first data decompression block configured to decompress the data, and
    wherein the first data compression block includes a bypass function to transfer the data to the data bus without compression based on a size of the data.

2. The communication system of claim 1, wherein the at least one master is a communication module.

3. The communication system of claim 2, wherein the communication module is configured to transfer the compressed data to an external system.

4. The communication system of claim 3, wherein the at least one slave is a memory.

5. The communication system of claim 4, wherein the memory is configured to store data decompressed by the first data decompression block.

6. The communication system of claim 1, wherein the at least one slave is a portable memory device.

7. The communication system of claim 2, wherein the communication module is operable in ultra-wide band.

8. The communication system of claim 1, wherein only compressed data is transferred to the data bus.

9. The communication system of claim 1, wherein the at least one master includes first and second masters.

10. The communication system of claim 9, wherein the first master is a central processing unit and the second master is a communication module.

11. The communication system of claim 10, wherein the central processing unit includes at least one of a second data compression block and a second data decompression block.

12. The communication system of claim 4, further comprising:
    a data bus arbiter configured to allocate priorities of the data bus.

13. A method for receiving data in a communication system including a communication module and a memory, comprising:
    receiving data in the communication module;
    compressing the received data;
    transferring the compressed data to a data bus;
    decompressing the transferred data in the memory; and
    storing the decompressed data to the memory,
    wherein the communication module includes a bypass function to transfer the received data without compressing the received data, based on a size of the received data.

* * * * *